(No Model.)
W. M. MURPHY.
PLUMBER'S BLOWPIPE.
No. 518,674. Patented Apr. 24, 1894.
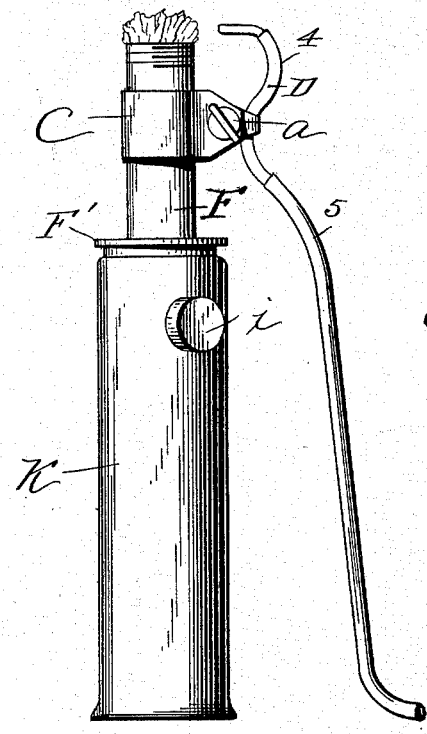
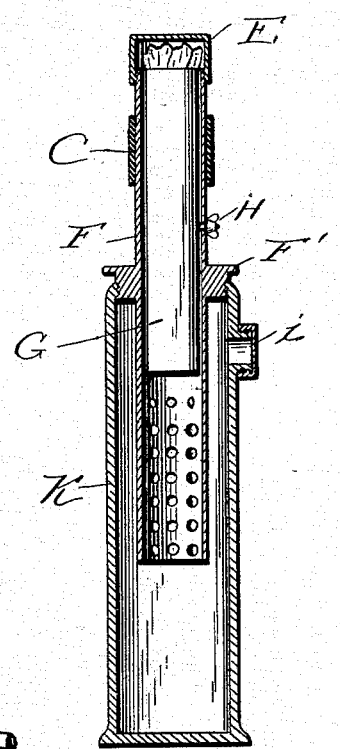
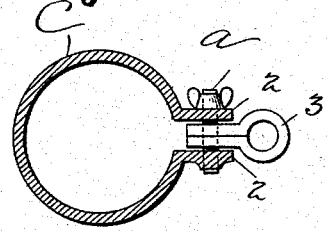
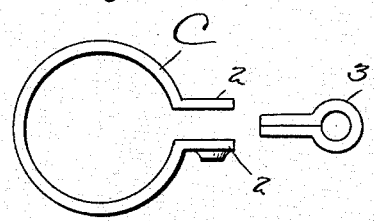
Attest
Wm. T. Hall.
J. M. Copenhaver.
Inventor
Wm. M. Murphy
by Walter Donaldson & Co.
Attys

UNITED STATES PATENT OFFICE.

WILLIAM M. MURPHY, OF PUTNAM, CONNECTICUT.

PLUMBER'S BLOWPIPE.

SPECIFICATION forming part of Letters Patent No. 518,674, dated April 24, 1894.

Application filed July 14, 1893. Serial No. 480,500. (No model.)

*To all whom it may concern:*

Be it known that I, WILLIAM M. MURPHY, a citizen of the United States, residing at Putnam, in the county of Windham and State of Connecticut, have invented certain new and useful Improvements in Plumbers' Blowpipes, of which the following is a specification, reference being had therein to the accompanying drawings.

My invention relates to an article for the use of plumbers comprising an alcohol reservoir, a wick holder therein and a blow pipe holder adjustable on the wick tube of the reservoir.

The invention is designed to take the place of soldering irons in making cup joints on lead pipe but may of course be used in other situations as well. Its principal advantage over a soldering iron is that there is no loss of time as is necessary in the heating of the iron; it is adapted for use in many situations where a soldering iron could not be used, and by the use of it a stronger and neater joint can be made.

In the drawings:—Figure 1, is an elevation of the article. Fig. 2, is a central vertical section of the same. Figs. 3 and 4 are detail views of the blow pipe holder.

The reservoir for the fuel, such as alcohol, is shown at K and is provided with a filling orifice at $i$. The reservoir is closed by a screw cap F' which carries a wick tube F having its lower end perforated and extending into the reservoir while its upper end extends above the cap F'. Within the tube F is a tube G to which the wick is secured and this is adjustable within the wick tube F by a thumb screw H. When not in use a cap E covers the end of the wick, being screwed upon the end of the wick tube F. Surrounding the wick tube is a collar C having its ends arranged parallel and between these parallel ends 2 is clamped the end of a second clamp 3 which encircles the end of the blow pipe D. Thus by passing a single thumb screw through the ends of the clamp C and the ends of the clamp 3, the parts are held in proper position and by loosening this thumb nut, shown at $a$, the collar C may be adjusted on the wick tube, or the blow pipe adjusted in its clamp. The blow pipe consists of a section 4 of metal pipe held in the clamp and terminating in a nipple supported in proximity to the wick to properly direct the air thereto, and a flexible section of tubing 5 extends to a suitable blower.

What I claim is—

In combination, the reservoir, the wick tube, an adjustable collar secured thereto, a blow pipe a clamp therefor supported from the collar and a thumb screw for securing the ends of the collar and clamp together, substantially as described.

In testimony whereof I affix my signature in presence of two witnesses.

WM. M. MURPHY.

Witnesses:
   G. B. CLEVELAND,
   JOHN A. CARPENTER.